(12) United States Patent
Wintel et al.

(10) Patent No.: US 8,239,371 B2
(45) Date of Patent: Aug. 7, 2012

(54) FAST SEARCH VIEWS OVER BUSINESS OBJECTS

(75) Inventors: Maic Wintel, Walldorf (DE); Frank Markert, Großostheim (DE); Martin Müller, Walldorf (DE); Ye Jin, Nürnberg (DE); Thilo Boehm, Heidelberg (DE)

(73) Assignee: SAP AG, Walldorf (DE)

( * ) Notice: Subject to any disclaimer, the term of this patent is extended or adjusted under 35 U.S.C. 154(b) by 411 days.

(21) Appl. No.: 12/195,750

(22) Filed: Aug. 21, 2008

(65) Prior Publication Data
US 2010/0049734 A1 Feb. 25, 2010

(51) Int. Cl.
*G06F 17/30* (2006.01)
(52) U.S. Cl. ........................................ 707/713; 707/714
(58) Field of Classification Search .................. 707/803
See application file for complete search history.

(56) References Cited

U.S. PATENT DOCUMENTS

| 6,850,933 | B2 * | 2/2005 | Larson et al. ........................... 1/1 |
| 7,406,468 | B2 * | 7/2008 | Larson et al. ........................... 1/1 |
| 7,467,128 | B2 * | 12/2008 | Larson et al. ........................... 1/1 |
| 7,734,619 | B2 * | 6/2010 | Vierich et al. ................. 707/718 |
| 7,761,477 | B1 * | 7/2010 | Luo et al. ....................... 707/803 |

* cited by examiner

*Primary Examiner* — Hung Q Pham
(74) *Attorney, Agent, or Firm* — Buckley, Maschoff & Talwalkar LLC

(57) ABSTRACT

A method and means, the method includes selecting a plurality of data sources having attributes to be included in a view entity; defining join conditions on the selected plurality of data sources; defining a set of attributes for the view entity by selecting attributes from the attributes of the plurality of data sources; and saving the view entity. The means includes a graphical user interface having a join builder tool to define join conditions on a selected plurality of data sources each including a pre-defined business object data structure having attributes; a view field definition tool to define a set of attributes for the view entity by selecting attributes from the attributes of the plurality of data sources; and a data source tree tool to display all of the attributes of the plurality of data sources.

19 Claims, 3 Drawing Sheets

200

```
┌─────────────────────────────────────────────────────┐
│   SELECT A PLURALITY OF DATA SOURCES TO BE INCLUDED │
│   IN A BUSINESS OBJECT-MODELED DATABASE VIEW ENTITY,│
│   THE PLURALITY OF DATA SOURCES EACH INCLUDING A PRE-│
│   DEFINED BUSINESS OBJECT DATA STRUCTURE HAVING ATTRIBUTES │
│                                                 205 │
└─────────────────────────────────────────────────────┘
                          │
                          ▼
┌─────────────────────────────────────────────────────┐
│        DEFINE JOIN CONDITIONS ON THE SELECTED       │
│              PLURALITY OF DATA SOURCES              │
│                                                 210 │
└─────────────────────────────────────────────────────┘
                          │
                          ▼
┌─────────────────────────────────────────────────────┐
│     DEFINE A SET OF ATTRIBUTES FOR THE VIEW ENTITY  │
│    BY SELECTING ATTRIBUTES FROM THE ATTRIBUTES OF THE│
│              PLURALITY OF DATA SOURCES              │
│                                                 215 │
└─────────────────────────────────────────────────────┘
                          │
                          ▼
┌─────────────────────────────────────────────────────┐
│          SAVE THE VIEW ENTITY TO PERSIST THE SET OF │
│              ATTRIBUTES OF THE VIEW ENTITY          │
│                                                 220 │
└─────────────────────────────────────────────────────┘
                          │
                          ▼
┌─────────────────────────────────────────────────────┐
│     PRESENT A GRAPHICAL REPRESENTATION OF THE VIEW  │
│    ENTITY, INCLUDING AN INDICATION OF THE ATTRIBUTES│
│                   OF THE VIEW ENTITY                │
│                                                 225 │
└─────────────────────────────────────────────────────┘
```

*FIG. 2*

FAST SEARCH VIEWS OVER BUSINESS OBJECTS

FIELD

Some embodiments herein relate to business object modeled databases. In particular, some embodiments concern a mechanism to design a model-based extension of the business object model that extends across multiple business objects.

BACKGROUND

As business oriented computing systems, applications, and platforms increase in complexity, the amount of data processed by the systems, applications, and platforms, including enterprise platforms, also increases in breadth and complexity. While the accurate modeling of business transactions, interactions, and relationships between different business entities may be a global goal on an enterprise-level, various business entities within an industry or organization may be more concerned with or only concerned with a specific area of a modeled business that is of particular relevance to their operations. As such, all of the business objects and associated attributes of those business objects may not be pertinent to a particular user, application, process, or service.

In some instances, greater efficiency and use of resources may be had by selectively and strategically defining the business objects and/or attributes thereof that may be made visible to a user, process, service, or application. The task of defining or otherwise determining which business objects are accessible to a particular entity may be daunting given the number of business objects that may be defined by an enterprise business object modeled application platform. In some instances, while a particular business object may be relevant to a user (e.g., a business entity), not all or even most of the associated business nodes and attributes encapsulated by the particular business object are relevant to the user's particular business operations and/or industry. This may be the case since the business object model may span different businesses and industries and include thousands of business nodes and attributes covering the different business units and industries.

Accordingly, a method and mechanism for efficiently defining and designing a model-based extension of the BO model that extends across multiple business objects is addressed by some embodiments herein.

DESCRIPTION OF DRAWINGS

FIG. 2 a flow diagram illustrating some aspects of the present disclosure.

DETAILED DESCRIPTION

Figure 1:
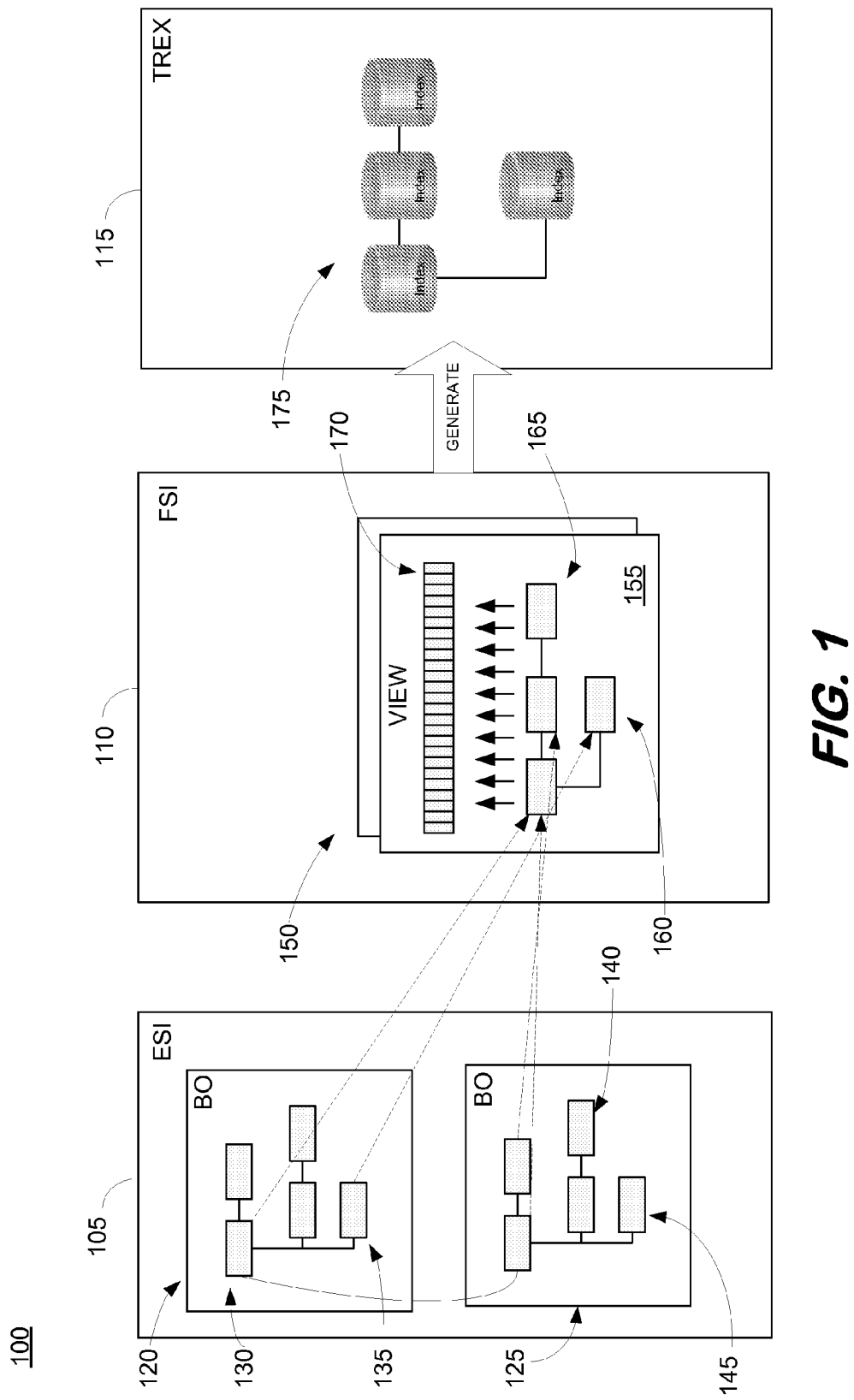
FIG. 1 is an exemplary block diagram of an operating environment, in accordance with various aspects of the present disclosure.

FIG. 1 is an illustrative block diagram of an enterprise computing environment 100 suitable for supporting, implementing, and providing services related to a business object modeled database. In general terms, the business object model defines business-related concepts for a number of business transactions. The business object model may reflect the decisions and relationships about real world businesses acting in business transactions and may span across different industries and business areas. The business object model is defined by business objects and their relationships to each other. Despite being applicable across different business entities and industries, business object model interfaces are consistent across the different industries and across different business units because they are generated using a single business object model. System 100 includes an Enterprise Service Infrastructure (ESI) 105 and a Fast Search Infrastructure (FSI) 110. In some embodiments, ESI 105 and FSI 110 may form or be a part of an application server. FSI 110 may interface with a search engine 115 such as, for example, the TREX search engine depicted in FIG. 1 and provided by SAP AG. Business objects (BOs), such a business objects 120 and 125, including their nodes (e.g., 130, 135, 140, 145) and all of their services (e.g., query services, not shown) are modeled and may include any suitable data structure. The business objects (BOs) are defined within ESI 105, wherein the definition for each BO includes BO nodes, BONs, (e.g., 130, 135) and various services (not shown) belonging to the BONs.

In some embodiments of the present disclosure, a model-based extension of the BO model is provided that extends across multiple BOs. Accordingly, the present disclosure provides and system, method, mechanism, and means for defining a new meta entity—a "View" entity. The View entity (also referred to as a View herein) is defined as a set of attributes that are linked to corresponding BO attributes of different BO Nodes and are connected to each other by database joins. The terms "join" and "joins" used herein refer to and are consistent with the use of those terms as used and understood in the field of database management systems.

Still referring to FIG. 1, BOs 120 and 125 are predefined data structures, each including a number of business object nodes such as BONs 130 and 135 associated with BO 120 and BONs 140 and 145 associated with BON 125. For purposes of clarity, all of the BONs of the representative BOs 120 and 125 are not individually labeled with reference numbers. However, it is clear from FIG. 1 that each BO may have a plurality of BONs associated therewith. Additionally, the relationships of the BONs of the BOs are depicted in FIG. 1 (e.g., parent—child relationships, siblings).

In some embodiments, the joins may be inner joins and left outer joins, thereby representing a certain view onto the BO model. The attributes of the View represents the registry of the underlying BO attributes. The underlying BO attributes may be used for selective indexing or replication of BO data. In operation at runtime, a View may be used, for example regarding a search engine, to execute query calls against generated indices based on the join conditions specified and defined with a View. Since the corresponding indices are structured according to the defined BO model structures, the execution of the query (or other service) may be done without any structural or data transformations.

A number of Views 150 may be created and defined within the FSI 110. The creation of the Views may be accomplished by using joins over different BONs. As illustrated in the example of FIG. 1, two BONs from BO 120 and two BONs from BO 125 may be used to construct and define a View 155 in FSI 110. The "lines" linking the BONs selected and included in the View are graphical representations of a database join (e.g., inner joins or left outer joins). Thus, it is seen that the data structure of a View may contain a select number of attributes of different BOs, as determined and represented by the selected and corresponding BONs (e.g., 160, 165) included in the View. In this manner, a View may contain a set of attributes in a pre-defined manner across different BONs, including desired or select attributes of the corresponding BONs.

In some aspects, the View may represent a logical "view" or collection of the underlying BO model. The view may encapsulate data modeling details, including but not restricted to, join relations between the multiple BONs associated with the View.

In some embodiments, the attributes of the joined BONs comprising the View, View Fields 170 herein, are exposed to external processes and services. The actual data sources related to the BONs of the View may be hidden from external or outside processes such that View Fields 170 of View 155 may be the only components of the View exposed and visible from the outside. In some embodiments, this aspect of the present disclosure allows only desired or relevant attributes associated with a business modeled entity to be observed, as defined by the View.

In some embodiments, the View attributes are persisted by replication in an index. A persistence of the View attributes may be generated and stored in indices 175 of a data structure. The indices (e.g., 175) may be associated with an application, function, or service such as, for example, a search engine (e.g., TREX search engine 115) and/or another data structure such as a database shadow table (not shown). In some aspects, the indices of the search engine correspond on a one-to-one (1:1) basis with the BONs of the View and are redundant-free and specific.

Metadata of the FSI views may be used as the basis for the data replication. The metadata of the views describes the data, that is the BONs, comprising the views that are to be replicated to data structures. The search engine or other applications, functions, and services may then use the indexed BONs in executing queries and/or other processes.

In some embodiments, the present disclosure relates to a tool, system, or application that provides a mechanism to design Views and View Fields using an intuitive graphical user interface (GUI). FIG. 2 is an illustration of a flow diagram depicting a process 200 including some aspects herein for building a View. Process 200 maybe better understood with reference to the GUI disclosed in FIG. 3. Therefore, process 200 will be described with reference to FIG. 3 in the following discussion.

At an operation 205, a plurality of data sources to be included in a business object-modeled database View are selected, defined, or otherwise determined that will comprise the View. In some embodiments, the plurality of data sources each include a pre-defined business object data structure having attributes, such as the BOs introduced and described above.

Figure 3:
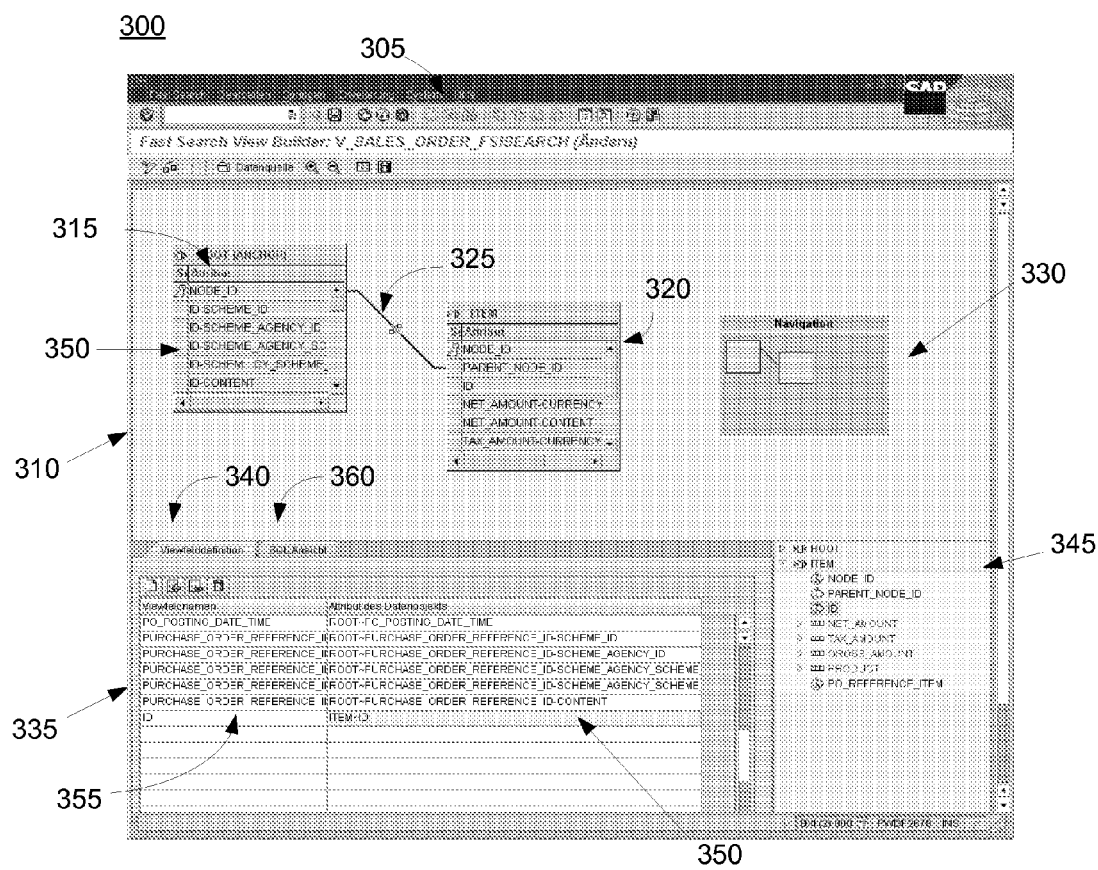
FIG. 3 is a example screen snapshot, in accordance with some embodiments herein.

FIG. 3 displays an exemplary GUI 300 that may be used by, for example, an application designer to design and build views. As shown, the depicted screenshot includes a View Builder user interface (UI) 305, including a Join Builder tool 310 located in an upper section of View Builder UI 305, a View Field Definition tool 335 located in the lower left portion of View Builder UI 305, and a Data Source Tree tool 345 located in a lower right side of View Builder UI 305.

It should be appreciated that the arrangement of the various components of View Builder UI 305 may be changed, modified, enhanced, pared down, or otherwise altered to differ from the particular layout and configuration depicted in FIG. 3. In some embodiments, the particular layout and configuration of View Builder UI 305 may be altered while aspects of the functionality are preserved to facilitate the designing and creation of the views as disclosed herein.

Join Builder tool 310 located in the upper section of the View Builder UI 305 allows a user to load BON descriptions and define join conditions between BONs. Each of the data structures that are selected for inclusion in the View being created may be displayed in a separate or distinct graphical representation such as boxes 315 and 320. Each graphical representation of the selected BONs, i.e., a box or other graphical representation, icon, or visual designator, may contain the name of the BON and a list of attributes 350 of the selected BON included in the View, as well as descriptions of the attributes.

At operation 210 of process 200, join conditions of the selected plurality of data sources are defined. Join Builder tool 310 permits a user to define and specify join conditions using a number of user interface manipulation methods and processes. For example, a join condition between BON 315 and 320 may be defined by a user drawing a line 325 between the BONs, a "drag and drop" operation, and other GUI processes, including keyboard and input device entries to link the BONs together by a join. In some embodiments, Join Builder tool 310 facilitates the specification of the available or permissible types of joins (e.g., left outer joins and inner joins in some embodiments).

Returning to process 200 of FIG. 2 at operation 215, a set of attributes for the view entity is defined by selecting attributes from the attributes of the plurality of data sources. View Field Definition tool 335 may be accessed by selecting tab 340 at the lower left portion of View Builder UI 305. In some embodiments, View Fields 345 may be the only elements of the View that are visible from the outside and provide access to mapped BON attributes. Field Definition tool 335 provides a mechanism for a user to name each View Field 355 and define the attributes 350 of the selected BONs comprising the View that will be associated with the BON in the View. Thus, BON—attribute pairs (355-350) are defined and created for the view. Each View Field represents an alias for a business object node—attribute pair (345-350) that is visible from the outside.

Data Source Tree tool 345 provides access to all of the attributes of loaded data sources (e.g., BONs 315 and 320). In particular, Data Source Tree tool 345 allows one defining the given View to specify which attributes of the underlying data source will be included in the View. Thus, the resulting View may have fewer attributes than the underlying and corresponding data sources. In some embodiments, replication, queries, and other applications and services against the defined Views may operate or be implemented more efficiently than, for example, searches against un-joined BONs since fewer attributes may be associated with the Views as compared to the BONs.

In some embodiments, a SQL View may be accessed by clicking on tab 355 at the lower left portion of the View Builder UI 305. In some embodiments, the SQL View tabbed page automatically displays a corresponding SQL statement when a join is created. SQL statements that are displayed SQL View synchronize fully with the graphical tool for building Views. Accordingly, when a View is graphically altered, the corresponding SQL statements are updated.

At operation 220, the View is saved to persist the set of attributes of the View. Persistance of the View allows the View to be used by applications and services that act on data structures.

At operation 225, a graphical representation of the View, including an indication of the attributes of the View is provided. This aspect of the present disclosure is shown in FIG. 3 where BONs 315 and 320 are graphically shown joined together by line 325 in the Join Builder tool section 310 and the corresponding attributes of the BON's may be displayed in View Field Definitions tool 335. In some aspects, display panel 330 provides a perspective of the BONs and the joins between the BONs therein.

In some aspects, only one type of a join may be used within a View. For example, in some embodiment all of the BONs within a given View may be linked by either an inner join or a left outer join. Using joins allows data to be retrieved from two or more BONs based on logical relationships between the nodes.

The embodiments herein may be implemented in computer hardware, firmware, software, or in combinations of them. Some embodiments may be implemented as a computer program product, i.e., a computer program tangibly embodied in a hardware medium, e.g., in a machine-readable storage device having program code or instructions stored thereof, for execution by, or to control the operation of, a data processor (e.g., a programmable processor, a computer, or network of computers). In some embodiments, a computer program in accordance with the present disclosure may be implemented independent of a particular programming language and/or processing system and/or computer operation or application platform.

Suitable processors for the execution of a program of instructions include, by way of example, both general and special purpose microprocessors, and the sole processor or one of multiple processors of any kind of computer. Storage devices and mediums suitable for tangibly embodying computer program instructions and data may include, for example, all forms of non-volatile memory, magnetic disks, magneto-optical disks, CD-ROM and DVD-ROM disks. In related embodiments, computer program may operate independent of any particular form of programming language, computing system, industry, application, communication protocol, and operating system.

A number of embodiments of the invention have been described herein. However, it will be understood that various modifications may be made without departing from the spirit and scope of the invention. Accordingly, other implementations are within the scope of the following claims.

What is claimed is:

1. A computer implemented method, the method comprising:
    selecting, by a processor of a computer acting in response to user input, a plurality of business objects nodes (BONS) to be included in a business object-modeled database view entity, the plurality of BONS being associated with and selected from at least two of a plurality of business objects (BOs), the plurality of BOs each being a pre-defined data structure including one or more of the plurality of BONS, and the BONS each having associated attributes;
    defining, by the processor in response to user input, join conditions of the selected plurality of BONS;
    defining, by the processor in response to user input, the view entity as a set of attributes selected from the attributes of the plurality of BONS and connected to each other by the join conditions;
    saving the view entity to persist the defined set of attributes of the view entity; and
    presenting a graphical representation of the view entity, including an indication of the set of attributes of the view entity.

2. The method of claim 1, further comprising selecting, by the processor acting in response to user input, a plurality of BONS associated with an existing view entity of the business object-modeled database.

3. The method of claim 1, further comprising associating a user selected name with the view entity.

4. The method of claim 1, wherein the join conditions are selected from one of an inner join and a left outer join.

5. The method of claim 1, wherein the join conditions are manually selected by a user.

6. The method of claim 5, wherein the join conditions are specified by one of the following methods: a user drawing a line between graphical representations of two of the plurality of BONS and a drag and drop operation.

7. The method of claim 1, wherein the defining of the set of attributes for the view entity comprises providing a name for each of the defined attributes.

8. The method of claim 1, wherein the view entity consists of metadata that describes an actual data source, and not the data of the BONS.

9. The method of claim 1, wherein the saving of the view entity comprises replicating the view entity to at least one of a database storage structure and a search engine.

10. The method of claim 9, wherein metadata associated with the view entity is used as a basis for determining data saved to the at least one database storage structure and the search engine.

11. The method of claim 9, wherein the set of attributes of the view entity are replicated to the at least one database storage structure and the search engine, not each attribute of the plurality of BONS associated with the view entity.

12. The method of claim 1, wherein the set of attributes of the view entity are exposed to external processes.

13. The method of claim 1, wherein the saving comprises generating an index based on the defined set of attributes.

14. A computer-readable storage medium storing a computer executable instructions thereon to provide a graphical user interface to facilitate the creation of a business object-modeled database view entity, the medium comprising:
    instructions for a join builder tool to define join conditions of a selected plurality of business object nodes (BONS), the plurality of BONS being associated with and selected from at least two of a plurality of business objects (BOs), the plurality of BOs each being a pre-defined data structure having including one or more of the plurality of BONS, and the BONS each having associated attributes;
    instructions for a view field definition tool to define a set of attributes for the view entity by selecting the set of attributes from the attributes of the plurality of BONS and the set of attributes being connected to each other by the join conditions; and
    instructions for a data source tree tool to display all of the attributes of the plurality of BONS, the set of attributes of the view entity being selected using the data source tree tool.

15. The medium of claim 14, wherein each of the selected plurality of BONS is presented in the graphical user interface in distinct graphical representations.

16. The medium of claim 14, wherein the join conditions are selected from one of an inner join and a left outer join.

17. The medium of claim 14, wherein the join conditions are manually selected by a user using the join builder tool.

18. The medium of claim 17, wherein the join conditions are specified by one of the following methods: a user drawing a link between graphical representations of two of the plurality of BONS and a drag and drop operation.

19. The medium of claim 14, wherein the view field definition tool provides a mechanism to provide a name for each of the defined attributes.

* * * * *